(No Model.)
J. L. FUSNER.
COFFEE POT.
No. 250,798.　　　　　　　Patented Dec. 13, 1881.
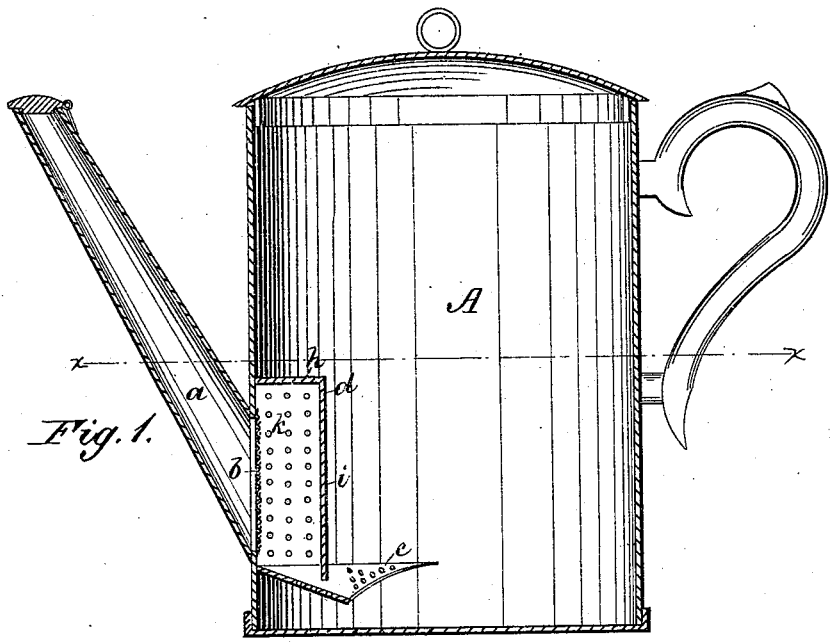
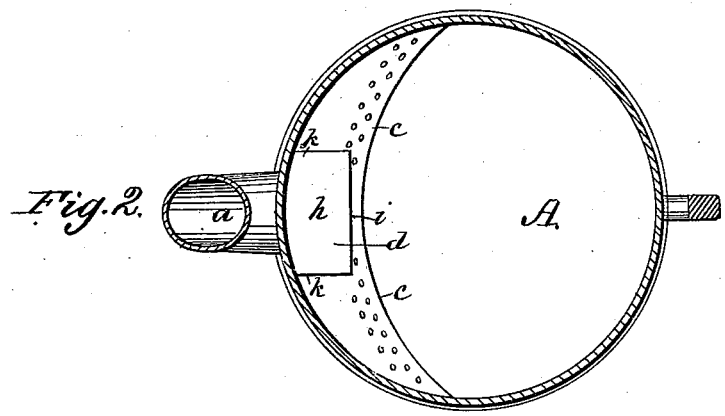
WITNESSES:　　　　　　　　　　　　INVENTOR:
W. W. Hollingsworth　　　　　　　Jesse L. Fusner
T. Read　　　　　　　　　　　　　BY
　　　　　　　　　　　　　　　　　　ATTORNEYS.

UNITED STATES PATENT OFFICE.

JESSE L. FUSNER, OF BELLAIRE, OHIO.

COFFEE-POT.

SPECIFICATION forming part of Letters Patent No. 250,798, dated December 13, 1881.

Application filed September 13, 1881. (No model.)

*To all whom it may concern:*

Be it known that I, JESSE L. FUSNER, of Bellaire, in the county of Belmont and State of Ohio, have invented a new and useful Improvement in Coffee-Pots; and I do hereby declare that the following is a full, clear, and exact description of the same, reference being had to the accompanying drawings, forming part of this specification, in which—

Figure 1 is a vertical section of my improved coffee-pot. Fig. 2 is a horizontal section in the line $x\ x$, Fig. 1.

My invention relates to improvements in coffee-pots; and it consists in the peculiar construction and arrangement of the parts, as hereinafter more fully set forth.

In the accompanying drawings, A represents the inside of my improved coffee-pot provided with a spout, $a$, having a strainer, $b$, over its inner end, all of the usual construction.

$c$ represents an inclined crescent-shaped shelf, conforming in shape with the inside of the coffee-pot, and secured thereto a short distance below the lower end of the spout. The shelf $c$ extends about half-way around the inside of the coffee-pot, and is arranged immediately below the spout $a$. The shelf $c$ is perforated along the inner curve of the crescent, the outer part of the shelf not being perforated.

$d$ represents a shield or protector, formed of the two angular plates or sides $h\ i$, secured together along their edges and provided with perforated sides $k\ k$. The shield $d$ is of box form and is placed over the strainer, the outer edge of the plate or top $h$ being secured to the inside of the coffee-pot immediately above the spout, and the sides $i\ k\ k$ of the shield resting on the perforated shelf $c$, the outer edges of the perforated sides $k\ k$ being secured to the inside of the coffee-pot on opposite sides of the spout.

In practice, in pouring coffee from my improved pot, the grounds at the bottom of the pot, when the latter is inclined, will be caught in the trap or angular space between the imperforate upper part of the shelf and the lower part of the inside of the pot and retained there, the coffee passing through the perforations in the shelf and shield, and thence out through the strainer and spout.

The imperforate plates $h\ i$ of the shield prevent any grounds or sediment from falling directly on the strainer, and at the same time a free flow of the coffee takes place through the perforated sides of the shield from the pot.

I claim as my invention—

1. The combination, with a coffee-pot, of the inclined crescent-shaped shelf $c$, secured to the inside of the pot below its spout, and provided with perforations near its inner edge, substantially as described, and for the purpose set forth.

2. The combination, with a coffee-pot provided with the spout $a$ and strainer $b$, of the inclined crescent-shaped shelf $c$, having perforations near its inner edge, and shield $d$, provided with the imperforate plates $h\ i$, and perforated sides $k\ k$, substantially as described, and for the purpose set forth.

JESSE LRENO FUSNER.

Witnesses:
J. C. MITCHELL,
M. D. REASONER.